SIGNAL CONVERTER CIRCUIT

Filed April 13, 1959 3 Sheets-Sheet 1

INVENTORS
JOSEPH P. WELSH
CARL J. ZARCONE
ROBERT H. RUGABER
BY Richard G. Stahr
ATTORNEY

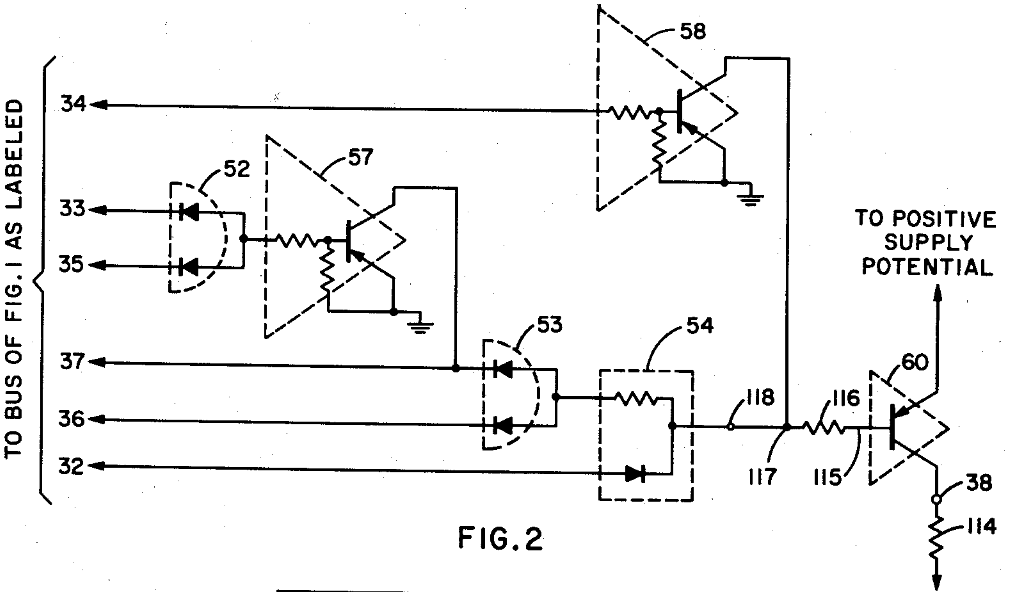
FIG. 2
TO NEGATIVE SUPPLY POTENTIAL
| DIGIT | "FLEXOWRITER" BINARY CODE | | | | | | BINARY CODED DECIMAL CODE | | | |
|---|---|---|---|---|---|---|---|---|---|---|
| | 1 | 2 | 3 | 4 | 5 | 6 | 1 | 2 | 3 | 4 |
| 0 | 1 | 1 | 1 | 1 | 1 | 0 | 0 | 0 | 0 | 0 |
| 1 | 0 | 1 | 0 | 1 | 0 | 1 | 0 | 0 | 0 | 1 |
| 2 | 1 | 1 | 1 | 0 | 0 | 1 | 0 | 0 | 1 | 0 |
| 3 | 1 | 1 | 0 | 0 | 0 | 1 | 0 | 0 | 1 | 1 |
| 4 | 1 | 0 | 1 | 0 | 0 | 1 | 0 | 1 | 0 | 0 |
| 5 | 1 | 0 | 0 | 1 | 0 | 1 | 0 | 1 | 0 | 1 |
| 6 | 1 | 0 | 1 | 1 | 0 | 1 | 0 | 1 | 1 | 0 |
| 7 | 1 | 1 | 0 | 1 | 0 | 1 | 0 | 1 | 1 | 1 |
| 8 | 1 | 0 | 0 | 0 | 0 | 1 | 1 | 0 | 0 | 0 |
| 9 | 1 | 1 | 0 | 1 | 1 | 0 | 1 | 0 | 0 | 1 |
FIG. 3
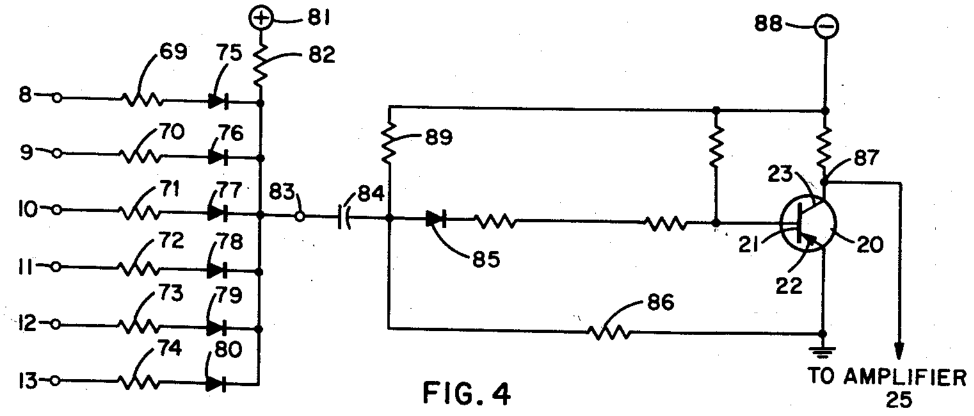
FIG. 4

Jan. 1, 1963 J. P. WELSH ETAL 3,071,763

SIGNAL CONVERTER CIRCUIT

Filed April 13, 1959 3 Sheets-Sheet 3

United States Patent Office 3,071,763
Patented Jan. 1, 1963

3,071,763
SIGNAL CONVERTER CIRCUIT
Joseph P. Welsh, Carl J. Zarcone, and Robert H. Rugaber, Rochester, N.Y., assignors to General Dynamics Corporation, Rochester, N.Y., a corporation of Delaware
Filed Apr. 13, 1959, Ser. No. 805,968
4 Claims. (Cl. 340—347)

The present invention relates to binary code converter devices and, more specifically, to devices for converting the signal waveforms, incompatible for use with transistor devices, of a binary code representation of any number of bits per group into signal waveforms, compatible with transistor devices, of a binary code representation of another number of bits per group.

With transistorized digital data translating equipment, it is frequently necessary to not only convert a binary code representation of one specific number of bits per group into a binary code representation of another specific number of bits per group but also to convert the characteristic waveform of the signals to be converted into another characteristic waveform which is compatible with transistor units. For example, many types of input-output devices, such as electric typewriters having remote input-output capabilities, have been designed to convert the several characters of the alphabet and the ten numerical digits into a binary code representation peculiar thereto and also to drive electromechanical relays, requiring signal pulses of a relatively high potential.

One example of equipment of this type is that which is sold under the trademark of "Flexowriter," a specific type of electric typewriter which perforates a paper tape with a binary code as the keyboard is operated. The signal pulses are taken from across the perforator punch drive magnets and are usually the rectified, unfiltered negative half-cycles of the service voltage. As these signals would have a potential waveform of too great a magnitude to be compatible with transistor devices, and since the binary code peculiar to the electric typewriter device being used may not be that to which the associated translating equipment present is adapted, it is necessary that signals of this type be converted to a potential waveform compatible for use with transistor devices and that the code be simultaneously converted to the binary code representation to which the translating equipment is adapted. As the use of transistorized digital data translating equipment is becoming increasingly common, the requirements of a binary code converter of this type which is economical in construction and reliable in operation is apparent.

It is, accordingly, an object of this invention to provide an improved binary code converter device.

It is another object of this invention to provide a binary code converter device employing only solid-state components.

It is a further object of this invention to provide an improved binary code converter device for converting incompatible waveform signals of a binary code representation of any number of bits per group into compatible waveform signals of a binary code representation of another number of bits per group.

In accordance with this invention, a device is provided for converting incompatible waveform signals of a binary code representation of any number of bits per group into compatible waveform signals of a binary code representation of any number of bits per group into compatible waveform signals of a binary code representation of another number of bits per group by producing a compatible waveform signal through a pulse converter circuit corresponding to each information bit position of the binary code representation to be converted and applying these signals to a plurality of switching circuits of the type which may be rendered conductive through the coincident application thereto of one or more electrical signals in such a manner that the electrical signals presented thereto is effective to render those of the switching circuits conductive for completing a circuit therethrough to associated individual output circuits from which the converted binary code may be removed.

For a better understanding of the present invention, together with further objects, advantages and features thereof, reference is made to the following description and accompanying drawings, in which:

FIGURE 2 is a detail of a portion of the switching circuitry illustrated in block form in FIGURE 1;

FIGURE 3 represents, in tabular form, certain information useful in understanding the present invention;

FIGURES 4, 5 and 6 are detailed schematic circuit diagrams of portions of the circuit of this invention indicated in FIGURE 1.

Figure 1:
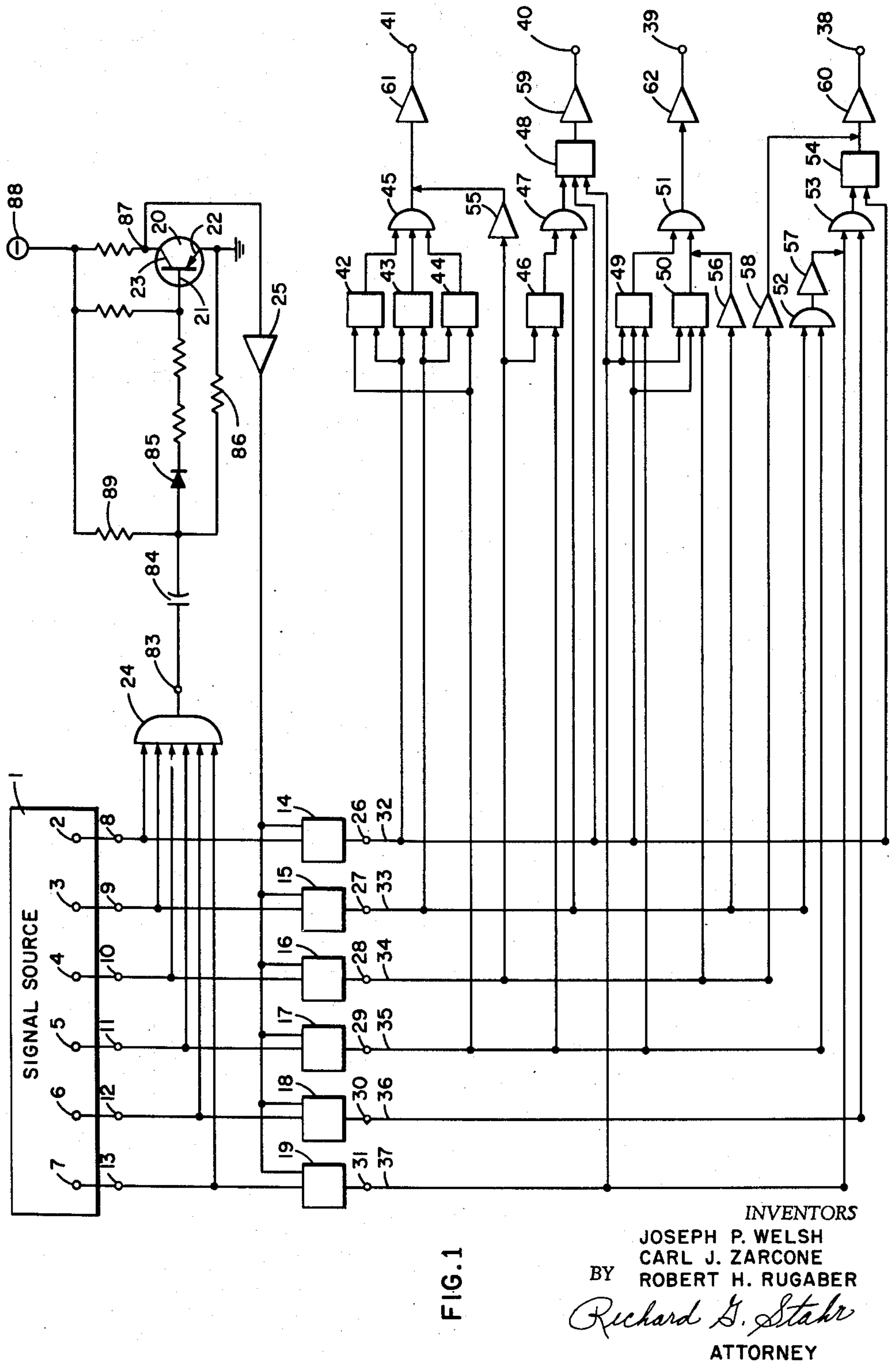
FIGURE 1 illustrates a preferred embodiment of this invention.

In the binary code system, discrete characters, that is, letters of the alphabet or decimal digits, may be expressed by a group of information bits of two different polarities, generally termed "mark" and "space" bits, wherein the presence of either polarity bit, selected to be significant, at any position within the group may be evidenced by a signal occupying that position, while the presence of the other polarity bit at any position within the group may be evidenced by the absence of a signal in that position. For purposes of describing the present invention, and without intending or inferring that it be limited thereto, the "mark" information bits will be selected to be significant and will be evidenced by the presence of an electrical signal, denoted as "1," while the "space" information bits will be evidenced by the absence of a signal, denoted as "0."

As has been brought out before, certain commercial electric typewriters which, with the operation of the keyboard, perforate a tape for each discrete character with the binary code representation of that character also produce output signals, obtained from the rectified, unfiltered service voltage, in the bit positions within the group occupied by "mark" information bits. When the translating equipment to be used therewith is of a transistorized version which is adapted to use a different number of bits per group binary code system, it is necessary that the signals obtained from the electric typewriter tape punch magnets be converted to the binary code representation compatible with the transistorized translating equipment in respect to both the waveform and number of bits per group.

For purposes of illustration only, therefore, and without intending or inferring that it be limited thereto, the following description of the present invention will be on the basis of converting a six bit-per-group binary code representation of decimal numbers, the signals of which have a waveform incompatible for use with transistor devices, into a four bit-per-group binary code representation of decimal numbers, the signals of which have a waveform compatible for use with transistor devices.

Although any suitable source of binary signals may be employed without departing from the spirit of this invention, it will be assumed that the source of binary signals in this instance is a conventional, commercial electrical typewriter of the type having remote input-output capabilities. Since the details of electric typewriters of this type are well known in the art and form no part of this invention, the signal source is illustrated by block form in FIGURE 1 by reference numeral 1. Each of the individual output circuit terminals 2, 3, 4, 5, 6 and 7 are connected across the punch drive electromagnets in the tape perforator mechanism thereof. Therefore, the presence of a "mark" polarity bit at any bit position within the six bit-per-group code will be evidenced by the presence of an electrical signal, obtained from the rectified, unfiltered service voltage, at the output circuit terminal corresponding to that position and will be denoted as "1."

An individual input circuit terminal is provided in the device of this invention for each information bit position of the binary code group to be converted and are indicated in FIGURE 1 as input terminals 8, 9, 10, 11, 12 and 13. Each of these input circuit terminals is connected to a corresponding output circuit terminal of signal source 1, as indicated.

To provide a trigger signal in response to the presence of a signal at any one or all of the individual input circuit terminals, a six input OR gate, indicated in block form in FIGURE 1 by reference numeral 24 and an associated inverted amplifier may be employed. The inverter amplifier comprises transistor 20, having the usual base 21, emitter 22 and collector 23 electrodes, with the associated circuitry to provide the proper bias requirements for conduction through a type P-N-P transistor. The details of OR gate 24 are illustrated in FIGURE 4 and the operation thereof in conjunction with the associated inverter amplifier will be explained in detail later.

Figure 5:
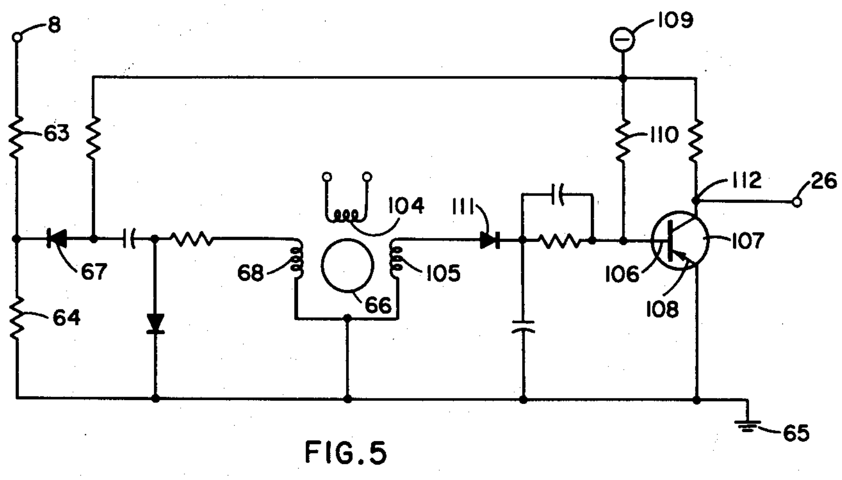

A plurality of signal converter circuits each of which is adapted to convert the relatively high negative potential waveform signals emanating from signal source 1 into lower negative potential level waveform signals which are more compatible with transistor circuitry are provided and are indicated in FIGURE 1 in block form by reference numerals 14, 15, 16, 17, 18 and 19. Each is connected to a respective input circuit terminal 8, 9, 10, 11, 12 and 13, as indicated. The detail circuitry of these devices is illustrated in FIGURE 5 and is disclosed in a copending application, Serial No. 797,486, filed March 5, 1959, assigned to the same assignee as the present application, and now abandoned.

Figure 6:
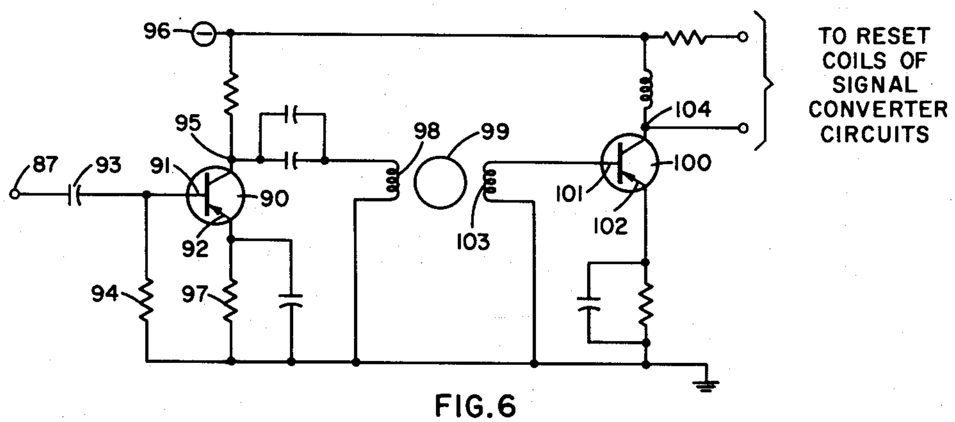

As each of these signal converter circuits requires the application of a substantial reset pulse for proper operation, a reset pulse amplifier 25 which is responsive to the trigger signals produced by transistor 20 and which serves as a reset signal source is provided. The details of this circuit are illustrated in FIGURE 6 and are disclosed in a copending application, Serial No. 796,476, filed March 2, 1959, now Patent No. 3,008,506, assigned to the same assignee as the present application.

An individual output circuit terminal, indicated by reference numerals 38, 39, 40 and 41, is provided for each respective information bit position of the converted binary code group, where terminal 38 corresponds to the least significant bit position within the group. Consistent with the assumptions outlined previously in this specification, the presence of an electrical signal at any one of these output circuit terminals signifies the presence of a "mark" bit, denoted by "1," occupying that position and the absence of a signal signifies a "space" bit, denoted as "0," occupying that position. The converted binary code, therefore, may be taken off terminals 38, 39, 40 and 41 and applied to external equipment, not shown.

Interposed between the signal converter circuits 14, 15, 16, 17, 18 and 19 and the converted binary code group output terminals 38, 39, 40 and 41 is a group of switching circuits each of the type which may be rendered conductive through the coincident application thereto of one or more electrical signals. These circuits may be of the well known gate type which, since the details are well known in the art and form no part of this invention, are illustrated in block form by reference numerals 42 through 54, inclusive. Of this group of switching circuits, those illustrated by reference numerals

42, 43, 44, 46, 48, 49, 50 and 54 are of the type which will produce an output signal upon the coincident presence of an electrical signal at each of their respective input terminals and will hereinafter be referred to as AND gates, while those circuits illustrated by reference numerals 45, 47, 51, 52 and 53 are of the type which will produce an output signal only upon the presence of an electrical signal at any one or all of their respective input terminals and will hereinafter be referred to as OR gates. Also included in the switching circuitry of the device of this invention are a group of solid-state switching circuits which, since the details are well known in the art and form no part of this invention, are illustrated in block form by reference numerals 55, 56, 57 and 58. It will be noted that the output terminal of switch 55 is connected to the output terminal of OR gate 45 and is necessary for the purpose of inhibiting the application of a signal which may be produced by OR gate 45 upon output circuit terminal 41 while a coincident signal is present at the input terminal of switch 55. Similarly, the output terminal of switch 56 is indicated as being connected to the output terminal of AND gate 50 for the purpose of inhibiting the application of a signal which may be present upon the output terminal of AND gate 50 upon OR gate 51 coincidentally with the presence of a signal at the input terminal of switch 56. The output terminal of switch 57 is shown as being connected to one of the input terminals of OR gate 53 for the purpose of inhibiting the application of a signal present upon bus 37 to OR gate 53 with the coincident presence of a signal at the input terminal of switch 57. Finally, the output terminal of switch 58 is indicated as being connected to the output terminal of AND gate 54 for the purpose of inhibiting the application of an output signal from AND gate 54 upon output circuit terminal 38 with the coincident presence of a signal at the input terminal of switch 58. The specific reasons for these inhibiting switches and their operation will be brought out in detail later. To complete the connections from the switching circuitry to the respective output circuit terminals, the output terminals of AND gates 48 and 54 are connected to output circuit terminals 40 and 38 through a conventional amplifier, if required, illustrated in block form at 59 and 60, while the output terminals of OR gates 45 and 51 are connected to output circuit terminals 41 and 39 through conventional amplifiers, if required, illustrated in block form at 61 and 62.

The respective input terminals of the several switching circuits are connected to the several buses 32, 33, 34, 35, 36 and 37 in such a manner that the signals produced by the signal converter circuits are effective to render those of the switching circuits conductive which will complete a circuit therethrough to those of the individual output circuits which correspond to those respective bit positions occupied by the first polarity bits of the converted binary code representation, in a manner now to be described.

Figure 7:
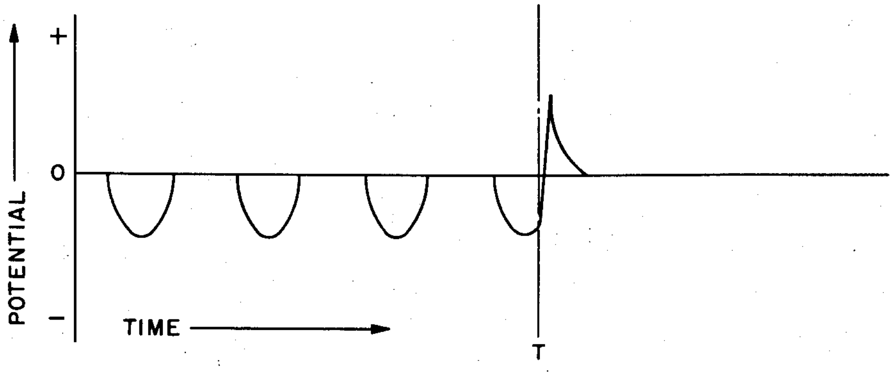
FIGURE 7 is a graphic illustration of a signal characteristic potential waveform useful in understanding this invention.

Assuming that the key of the electric typewriter for the numerical digit 2 is operated, the punch magnets corresponding to bit positions 1, 2, 3 and 6 of the six bit-per-group code will be operated. Referring to the table of FIGURE 3, it may be noted that the six bit-per-group binary code representation for the decimal digit 2 is the the presence of a "mark" polarity bit, "1," in the first, second, third and sixth bit positions and the presence of a "space" polarity bit, "0," in the fourth and fifth bit positions. As these punch magnets are operated, and since they are relatively slow in operation, a series of negative pulses from the rectified, unfiltered service voltage will appear at output terminals 2, 3, 4 and 7, corresponding to the first, second, third and sixth bit positions of the binary code group, of signal source 1. As the punch mechanism is relatively slow acting, with a conventional sixty-cycle service voltage a series of negative pulses will appear at each of these output circuit terminals with each charatcer as shown in FIGURE 7. As this negative signal potential is applied to respective input circuit terminals 8, 9, 10 and 13, it is impressed upon signal converter circuits 14, 15, 16 and 19, as indicated.

Referring now to FIGURE 5, where like elements have been given like characters of reference, the detailed operation of only one of signal converter circuits, 14, will be detailed in that the operation of each is identical with the operation of every other. The signal appearing at input circuit terminal 8 is divided across a voltage divider network comprising series resistors 63 and 64 connected across terminal 8 and point-of-reference potential 65. This negative-going signal potential is applied to a core 66, composed of magnetic material having relatively square hysteresis loop characteristics and two stable states of magnetic saturation, through diode 67, poled to conduct negative-going signals, and input coupling winding 68, as indicated. This negative-going signal potential sets the core 66 into either one of its two stable conditions of saturation in which condition it remains regardless of the length of time that the punch magnets of signal source 1 are closed in that the potential pulses applied thereto during this period are all negative. As the typewriter key is released at time T of FIGURE 7, the punch magnet circuits are opened and a resultant sharp positive spike is thereby produced. This sharp positive spike is, of course, presented to input circuit terminals 8, 9, 10 and 13, simultaneously; however, they are blocked from each of the signal converter circuits by the oppositely poled diodes in the input circiuts thereof. The negative pulses present during the period of operation of the teletypewriter key have served to set the cores in each of converter circuits 14, 15, 16 and 19, thus preparing them for the production of respective pulses of a potential waveform compatible with transistor devices upon the application thereto of a reset pulse from amplifier 25.

Referring now to FIGURE 4, where like elements have been given like characters of reference, which details the circuitry of six input OR gate 24, it may be noted that this OR gate is conventional in design and comprises a series of six resistors 69, 70, 71, 72, 73 and 74 and corresponding diodes 75, 76, 77, 78, 79 and 80, each of which is poled to conduct positive-going signals and each of which is slightly back-biased from a positive potential supply 81 and bias resistor 82 to prevent the conduction of spurious positive pulses of a relatively low magnitude. The previously described sharp positive-going spikes which occur upon the opening of the punch magnet circuits in signal source 1 are, of course, presented to diodes 75, 76, 77 and 80, from respective output circuit terminals 2, 3, 4 and 7, through respective input terminals 8, 9, 10 and 13 and resistors 69, 70, 71 and 74. These positive-going spikes are of sufficient magnitude to overcome the back-bias of positive potential source 81, thereby resulting in a positive-going output signal appearing on the output terminal 83 of gate 24. This positive-going signal is applied through a coupling network comprising capacitor 84, resistor 86 and diode 85 to the base 21 of normally conducting type P-N-P transistor 20. As this positive potential renders the base 21 of transistor 20 positive in respect to the emitter 22, transistor 20 is rendered nonconductive in that this does not satisfy the base-emitter bias requirements for conduction through a type P-N-P transistor. At this time, the potential of point 87 goes from substantially ground potential to a negative potential substantially equal to the supply potential 88 thereby producing the inversion action as previously described. It should be noted that diode 85, poled to conduct positive pulses, is back biased by the negative potential of source 88 and bias resistor 89 to prevent the action of transistor 20 on spurious positive pulses which may be applied thereto. This negative-going trigger signal pulse, produced in response to the presence of a signal at any one or all of the respective individual input terminals of OR gate 24, is applied to a reset signal source 25, the details of which will be explained later. It should be pointed out that the absence of a pulse on all of the respective input terminals 8 through 13, inclusive, would result in the absence of a pulse at the output terminal 83 of OR gate 24; therefore no trigger signal would be produced. The action of the gate, and inverter network hereinabove described, automatically inserts a sufficient delay in the production of a reset pulse which is to be applied to the respective signal converter circuits to assure the application thereto after the cores contained therein have been set by the presence of negative-going potential signals in their respective input circuit terminals.

Referring now to FIGURE 6, where like elements have been given like characters of reference, the details of reset pulse source 25 are indicated. The negative-going potential trigger signal pulses taken off point 87 of transistor 20 are applied to the base 91 of transistor 90 through an input coupling network comprising capacitor 93 and resistor 94. The negative signal pulse applied to base 91 of transistor 90 renders the base 91 negative in respect to the emitter 92 thereof, a condition which satisfies the base-emitter bias requirements for conduction through a type P-N-P transistor, thereby turning transistor 90 sharply "on." As transistor 90 is turned "on," point 95 goes from a negative potential substantially equal to the supply potential of source 96 to substantially ground potential as determined by emitter-resistor 97. The resulting current flow through coupling winding 98 of core 99 reverses the condition of operation of core 99, made up of a magnetizable material having relatively square hysteresis loop characteristics and two stable conditions of operation, and induces a negative potential in output coupling winding 103. Coupling winding 103 is poled in such a manner as to present a negative-going signal to the base 101 of transistor 100, thereby rendering the base 101 negative in respect to the emitter 102. As this satisfies the base-emitter bias requirements for conduction through a type P-N-P transistor, transistor 100 is rendered conductive. Upon the removal of the trigger pulse from the base 91 of transistor 90, transistor 90 becomes nonconductive in that the base-emitter bias requirements for conduction therethrough are no longer satisfied, and point 95 thereof returns to a negative potential substantially equal to that of the supply potential. The resulting negative-going signal energizes coil 98 and core 99 is reset to its original stable state, producing an output signal in output coupling winding 103 which is positive-going at this time. This positive-going signal is applied to the base 101 of transistor 100, thereby rendering transistor 100 nonconductive in that the base-emitter bias requirements for conduction through a type P-N-P transistor are no longer satisfied. As transistor 100 is rendered sharply conductive and then sharply nonconductive through the transformer action of core 99, the potential of point 104 goes from a negative potential substantially equal to the supply potential to substantially ground potential and back to the original negative potential, thereby producing a steep wave front reset signal pulse which is applied to the reset windings of the several magnetic cores included in signal converter circuits 14, 15, 16, 17, 18 and 19. In the typical detailed diagram of these circuits, FIGURE 5, the reset winding is indicated by reference numeral 104.

The reset windings of each of the magnetic cores in the respective signal converter circuits are poled in such a manner as to return their associated magnetic cores to their original condition of magnetic saturation, thereby producing output potential signals in the several respective output coupling windings thereof which are of such a characteristic waveform as to be compatible with transistor devices. The output coupling winding is indicated in the typical detailed schematic circuit of FIGURE 5 by reference numeral 105.

It may be noted in FIGURE 5 that the signal converter circuit includes a type P-N-P transistor in the output circuit. As the base 106 of transistor 107 is negative in respect to the emitter 108 in that a negative potential from source 109 is applied through resistor 110 to the base 106 thereof, the base-emitter bias requirements for conduction through a type P-N-P transistor are satisfied and transistor 107 is normally in a conducting condition. The potential signal produced in output coupling winding 105, which is poled in such a manner as to produce a positive-going pulse at this time, is applied through diode 111 to the base 106 of transistor 107, thereby rendering the base 106 positive in respect to the emitter 108 thereof. As this condition does not satisfy the base-emitter bias requirements for conduction through a type P-N-P transistor, transistor 107 is rendered nonconductive and point 112 goes from substantially ground potential to a negative potential substantially equal to the supply potential 109. In this manner then, those signal converter circuits which correspond to the bit positions within the six bit-per-group code in which a "mark" polarity bit is present each produce a negative-going signal pulse in that bit position which appears at the output terminal thereof. In this instance, since it has been assumed that the decimal digit 2 has been impressed upon the respective input circuit terminals 8 through 13, inclusive, a negative-going signal pulse will appear at each of output circuit terminals 26, 27, 28 and 31 of signal converter circuits 14, 15, 16 and 19 and buses 32, 33, 34 and 37.

As output circuit terminals 38, 39, 40 and 41 correspond to the first, second, third and fourth bit positions, respectively, of the converted four bit-per-group binary code, and since the four bit-per-group binary code representation of the digit 2 is the appearance of a "mark" bit in the third position thereof, see the right side of the table of FIGURE 3, an output electrical signal must be present upon output circuit terminal 40.

Considering first output circuit terminal 41, there will be no output signal present upon the respective output terminals of AND gates 42 and 44 in that there is no signal present upon bus 35. However, the coincident presence of negative-going signal pulses upon respective buses 32 and 33 are coincidentally applied to the input terminals of two input AND gate 43 thereby producing an output signal therefrom which is applied to one of the input terminals of OR gate 45. Normally, the output signal present upon the output terminal of OR gate 45 would be applied to output circuit terminal 41 through amplifier 61. However, the negative-going signal pulse also present upon bus 34 is applied to the input terminal of switch 55 which thereby prevents the application of the output signal from OR gate 45 through amplifier 61 to output circuit terminal 38 in a manner to be later explained in detail.

Considering next output circuit terminal 40, the coincident presence of a negative-going signal pulse upon buses 34 and 35 are applied to the respective input terminals of two input AND gate 46. The resulting output signal appearing at the output terminal of AND gate 46 is applied to one of the input terminals of OR gate 47, resulting in an output signal therefrom which is applied to one of the input terminals of three input AND gate 48. The negative-going signal pulses present upon buses 32 and 37 are also each applied to a respective one of the input terminals of three input AND gate 48, resulting in the production of an output signal at the output terminal thereof which is applied to output circuit terminal 40 through amplifier 59.

In the case of output circuit terminal 39, the absence of a negative-going signal pulse upon bus 35 destroys the coincident presence of a signal at each of the three input terminals of three input AND gate 49, thereby resulting in the absence of an output signal at the output terminal thereof. Although there is the coincident presence of three signals at the respective input terminals of three input AND gate 50, in that negative-going signal pulses are present upon buses 32, 34 and 37, the presence of a signal upon bus 33, which is applied to the input terminal of switch 56, thereby prevents the output signal which appears at the output terminal of gate 50 from being applied to the other input terminal of OR gate 51, in a manner to be later explained. As there is no signal present at either of the input terminals of OR gate 51, there is no signal present upon output circuit terminal 39.

Finally, the presence of a negative-going signal pulse on bus 34 which is applied to the input terminal of switch 58 prevents the passage of any signal which may be present upon the output terminal of AND gate 54 through amplifier 60 to output circuit terminal 38.

The four bit-per-group binary code representations of the remaining nine digits may be produced upon output circuit terminals 38, 39, 40 and 41 through the application of the electrical signals produced by the signal inverter circuits to the respective buses 32 through 37, inclusive, and applied to the several switching circuits in the same manner as has just been described.

Without intending or inferring that this invention be limited thereto, one switching circuitry scheme which was successfully employed in a tested model of a device of this invention is detailed in FIGURE 2 where like elements have been given like characters of reference. As the circuit details and operation of the switching circuitry involved with each output terminal is similar, in the interest of reducing drawing complexity, only that circuitry relative to the output circuit terminal 38, believed to be representative, is indicated. It may be noted that OR gates 52 and 53 consist of two diodes each while AND gate 54 is a two-input AND gate having a resistor and a diode. From this detailed diagram, the inhibiting action of the respective switches 57 and 58 may be noted. Each of switches 57 and 58 consist of a single type P-N-P transistor in a normally nonconducting state in that the base and emitter thereof are at substantially the same potential, a condition which does not satisfy the base-emitter bias requirements for conduction through a type P-N-P transistor. The appearance of a negative-going pulse in bus 34, for example, renders the base of the type P-N-P transistor of switch 58 negative in respect to the emitter thereof, thereby producing conduction through the transistor. Similarly, the appearance of a negative-going pulse at the output circuit terminal of OR gate 52 would render the transistor of switch 57 conductive for the same reason. Thus, any signal appearing upon bus 37 would be grounded through the conducting transistor of switch 57, while any signal appearing at the output circuit terminal of AND gate 54 would be grounded through the conducting transistor of switch 58. Amplifier 60 may be a type P-N-P transistor, as indicated, and the output may be taken from output circuit terminal 38 across resistor 114. Should amplifier 60 not be required, the end 115 of resistor 116 may be connected to ground and output circuit terminal 38 inserted between end 117 of resistor 116 and output terminal 118 of AND gate 54.

In describing a preferred embodiment of this invention, definite polarities and transistor types have been used. It is to be specifically understood that polarities and transistor types may be altered without departing from the spirit of this invention.

While a preferred embodiment of this invention has been shown and described, it is obvious to those skilled in the art that various modifications, alterations and substitutions may be made without departing from the spirit of the invention which is to be limited only within the scope of the appended claims.

What is claimed is:

1. A signal converter circuit coupled to a signal source having a given plurality of output terminals, said signal source producing a given signal on selected individual ones of said output terminals and an absence of signal on non-selected individual ones of said output terminals, said given signal having a waveform consisting of a series of one or more consecutive first pulses of a given polarity followed by a second pulse of a polarity opposite to said given polarity, said signal converter means comprising a plurality of bistable devices individually associated with each of said output terminals, each of said bistable devices having first and second stable conditions, a plurality of first polarity sensitive means each of which couples an individual one of said output terminals to said bistable device individually associated therewith for effecting the switching of that bistable device from said first to said second stable condition thereof in response to a first pulse being applied thereto, second polarity sensitive means including an OR gate coupling all said output terminals to all said bistable devices for switching said bistable devices from said second to said first stable condition thereof in response to a second pulse, and individual means coupled to each bistable device for deriving a single third pulse of predetermined amplitude and duration in response to that bistable device being switched from said second to said first stable condition thereof.

2. The signal converter circuit defined in claim 1, wherein each bistable device includes a ferrite core, wherein each core is set by said first polarity sensitive means coupled to the bistable device including that core in response to a first pulse and is reset by said second polarity sensitive means in response to a second pulse.

3. The signal converter circuit defined in claim 2, wherein said second polarity sensitive means includes time delay means for providing a time delay between the occurrence of a second pulse and the reset of the cores.

4. The signal converter circuit defined in claim 1, wherein a first pulse has at least a first certain amplitude and a second pulse has at least a second certain amplitude, wherein each first polarity sensitive means is baised to respond only to an input signal having both said given polarity and at least said first certain amplitude, and wherein said second polarity sensitive means is biased to respond only to an input signal having both said polarity opposite to said given polarity and at least said second certain amplitude.

References Cited in the file of this patent

UNITED STATES PATENTS

| | | |
|---|---|---|
| 2,768,367 | Rajchman | Oct. 23, 1956 |
| 2,782,399 | Rajchman | Feb. 19, 1957 |
| 2,798,667 | Spielberg et al. | July 9, 1957 |
| 2,809,303 | Collins | Oct. 8, 1957 |
| 2,819,395 | Jones | Jan. 7, 1958 |
| 2,832,063 | McMillan et al. | Apr. 22, 1958 |
| 2,920,317 | Mallery | Jan. 5, 1960 |
| 2,954,550 | Starr et al. | Sept. 27, 1960 |
| 2,987,709 | Bonn | June 6, 1961 |